Dec. 18, 1962  J. R. OISHEI  3,068,506
COMBINED WINDSHIELD CLEANER AND WASHER
Filed Feb. 19, 1958  2 Sheets-Sheet 1

INVENTOR.
JOHN R. OISHEI
BY
Bean Brooks Buckley + Bean
ATTORNEYS

Dec. 18, 1962     J. R. OISHEI     3,068,506
COMBINED WINDSHIELD CLEANER AND WASHER
Filed Feb. 19, 1958     2 Sheets-Sheet 2

INVENTOR.
JOHN R. OISHEI
BY
Bean Brooks Buckley + Bean
ATTORNEY'S

United States Patent Office 3,068,506
Patented Dec. 18, 1962

3,068,506
COMBINED WINDSHIELD CLEANER AND WASHER
John R. Oishei, Buffalo, N.Y., assignor to Trico Products Corporation, Buffalo 3, N.Y.
Filed Feb. 19, 1958, Ser. No. 716,140
11 Claims. (Cl. 15—250.02)

This invention relates to an improvement in the field of windshield cleaning apparatus wherein the windshield is jointly acted on by a solvent and windshield wiper.

For the purpose of cleaning a windshield while an automobile is in motion, a windshield washer pump is employed for projecting a solvent against the windshield and windshield wipers subsequently distribute the fluid and clear the glass. During this operation it is essential to initiate the solvent projection prior to the actuating of the wipers in order to provide the fluid in advance of the blade motion so as to make the equipment safe against smear and avoid impairment of vision, as would occur in encountering road splash or roadway wheel spray. Of further importance is the need to continue the wiper blade operation for a period after the solvent projection is terminated to insure that the windshield is wiped to a substantially dry clear state. It is with the accomplishment of the foregoing in a simple, efficient and economical manner that the present invention is concerned.

An object of the invention is to provide an improved coordinated control for a windshield cleaning system which insures the wetting, wiping and drying of the glass in proper sequence.

Another object of the invention is to provide an improved control for a windshield cleaner system that can be optionally applied to windshield wiper systems employing an electric wiper motor or fluid pressure wiper motor.

Other objects and attendant intended advantages of the invention will readily be perceived hereafter.

The present invention relates to a windshield cleaning system comprising a wiper, a motor coupled to said wiper, delivery means for delivering fluid to a windshield, a first control for actuating said delivery means, a second control for actuating the wiper motor in response to the delivery of fluid from said delivery means to thereby insure that the fluid delivery precedes the wiper operation, and electrical means for continuing operation of said motor for a predetermined period after said delivery means ceases to operate to thereby insure that the windshield is in a substantially dry state and therefore free of distortion producing solvent at the end of the cleaning operation. The present invention will be more fully understood when the following portions of the specification are read in conjunction with the accompanying drawings wherein:

Figure 1:
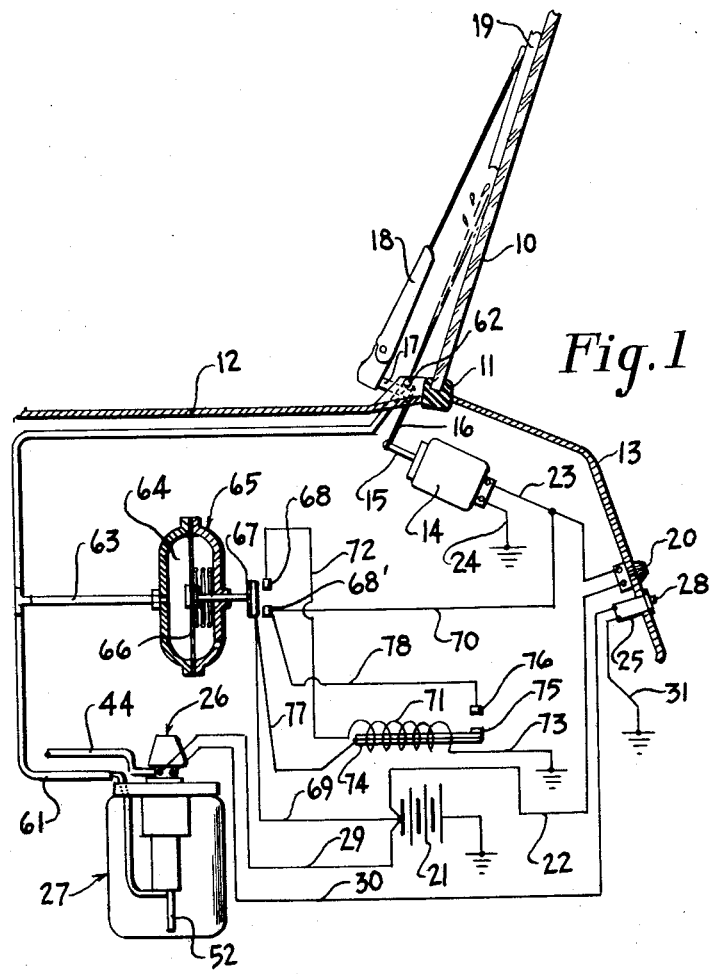
FIG. 1 is a schematic diagram showing the present invention applied to a windshield cleaning system employing an electric motor.

Reference is now made to FIG. 1 wherein windshield 10 is shown mounted on supporting molding 11 which is generally positioned at the junction between the automobile cowl 12 and the instrument panel 13. An electric motor 14 is suitably mounted behind instrument panel 13, and shaft 15 of the motor 14 is coupled through a suitable linkage 16 to the rockshaft 17 which is suitably journaled in cowl 12. A windshield wiper arm 18 has one end thereof mounted on shaft 17, the other end thereof supporting wiper 19.

When it is desired to operate the wiper in the conventional manner to clear moisture from windshield 10, single-pole single-throw switch 20, which is mounted on instrument panel 13, is actuated to complete a circuit from battery 21 through lead 22, switch 20, lead 23, motor 14 and lead 24 to ground. When it is desired to discontinue operation of the wiper, switch 20 is opened in the conventional manner to break the electrical circuit to motor 14, whereupon conventional parking mechanism (not shown) will park the wiper out of the line of vision of the driver, as is well known in the art.

When it is necessary to clean the windshield while driving, switch 25, which is mounted on instrument panel 13, is momentarily actuated to energize solenoid 26 (FIGS. 1, 2, 3 and 4) of the washer 27. Switch 25 is the type which is spring-biased in an open position and will complete a circuit to solenoid 26 only while button 28 is depressed, this circuit being completed from battery 21 through leads 29, 30 and 31.

Mounted in housing 32 of selonoid 26 (FIG. 4) is a solenoid coil 33. A solenoid armature 34 is biased upwardly by spring 35 which is interposed between armature 34 and bushing 36 which is in turn supported in casing 37 which houses solenoid coil 33. When the solenoid circuit is energized, as described above, armature 34 will be pulled downwardly to strike pin 38, which is axially movable in bushing 36. The downward movement of pin 38 will cause valve stem 39 to be moved downwardly against the bias of spring 40. Rigidly affixed to the upper end of stem 39 is valve 41, and rigidly affixed to the lower end thereof is valve 42. The downward movement of stem 39 will cause valve 42 to uncover circumferential groove 43 which communicates with conduit 44 (FIGS. 1, 2, 3 and 4) which in turn communicates with a source of suction, such as the engine intake manifold. The downward movement of stem 39 will also cause valve 41 to come into contact with seat 45 where it is held against the bias of spring 40 by the suction which acts on the underside thereof through oversized bore 46 surrounding stem 39, the suction being provided because lower valve 42 is now unseated to permit communication between circumferential groove 34 and bore 46.

Immediately following the foregoing action of stem 39, communication is established between the source of suction and chamber 47 (FIG. 3) through conduit 44 and circumferential groove 43, valve 42 now uncovering the latter. This will cause the differential pressure on the opposite faces of piston 48, which rides up and down in chamber 47, to be pulled upwardly against the force exerted by compression spring 49. The upward movement of piston 48 will cause a corresponding upward movement of the piston 50 which in turn causes cleaning solvent to be taken from receptacle 51, through conduit 52, and past one-way valve 53 which opens only as piston 50 moves upwardly, the operation of this type of one-way valve being well known in the art.

Figure 3:
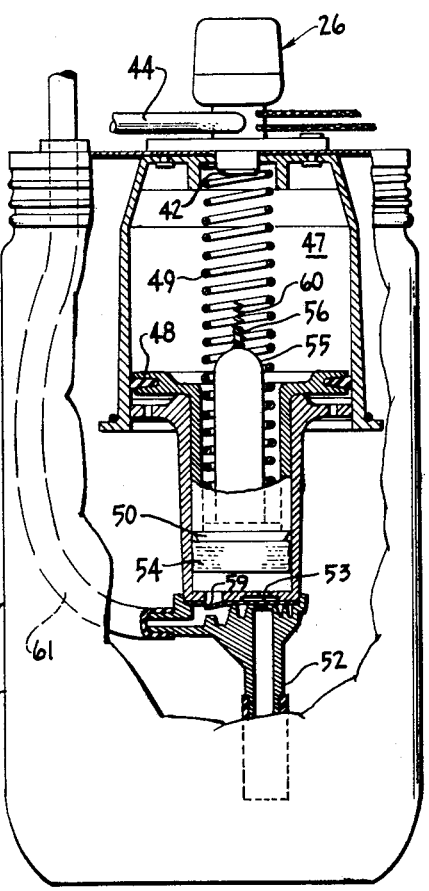
FIG. 3 is a view, partly in section, illustrating a type of windshield washer which may be used.
Figure 4:
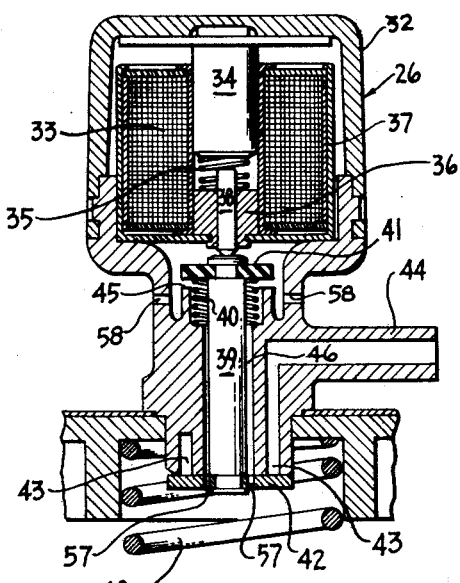
FIG. 4 illustrates the actuating mechanism for the washer of FIG. 3.

When pistons 48 and 50 reach the uppermost limit of their travel, the chamber 54, in which piston 50 travels, will be fully charged with solvent. The solvent charge in chamber 54 is automatically discharged when valve actuator 55, which may be attached to piston 50, reaches a position where pin 56, which is affixed to the top thereof, strikes valve 42 (FIGS. 3 and 4). This causes valve 42 to move upwardly to close circumferential groove 43, and thus terminate communication between chamber 47 and the source of suction. Simultaneously, valve 41 will be unseated and thereby permit communication between chamber 47 and the atmosphere through ports 57 in valve 42, oversized bore 46, the space surrounding spring 49, and ports 58 in valve casing 26. As soon as communication is thus established, spring 49 will cause pistons 48 and 50 to move downwardly to the position shown in FIG. 3, and thereby cause the charge of fluid in chamber 54 to be discharged through one-way valve 59 which operates in the well known manner. It is to be noted that a light spring 60 surrounds pin 56 for the purpose of maintaining a slight pressure on valve 42 to keep it closed as piston 48 moves downwardly.

The charge of fluid passes through conduit 61 (FIGS. 1, 2 and 3) to nozzle 62, which is located adjacent windshield 10. Because of the small size of nozzle 62 relative to the size of conduit 61, a pressure will build up in the latter as piston 50 moves downwardly. This will cause fluid pressure to be transmitted through conduit 63 into chamber 64 of hydro-electric switch 65. The increased pressure will distend flexible diaphragm 66 and cause switch 67 attached thereto to close against contacts 68 and 68'. It will readily be appreciated that the closing of switch 67 will not occur until slightly after the time that fluid is discharged from nozzle 62. Switch 67 thus completes a circuit to the electric wiper motor to cause it to actuate the wiper 19 after fluid is supplied to the windshield. To this end it can be seen from FIG. 1 that when switch 67 is placed into contact with terminals 68 and 68', a circuit is completed from battery 21 through lead 69, switch 67, terminal 68', lead 70, lead 23, motor 14 and lead 24 to ground.

It is desirable and, in fact, necessary for optimum operation of the cleaning system to have the windshield wipers operate for a few cycles after the flow of liquid through nozzle 62 terminates to clear the windshield of excess distortion-producing solvent. It will readily be appreciated that once fluid ceases to flow through conduit 61, resilient diaphragm 66 in switch 65 will return to its normal position (FIG. 1), and the above described circuit to electric motor 14 will be broken.

However, in order to insure that the wiper motor continues operation after switch 67 is opened, the following structure is provided: A resistance heater 71 is coupled to battery 21 through lead 69, switch 67, terminal 68, lead 72, and lead 73 to complete the circuit to ground. It can thus be seen that the resistance heater is energized only while switch 67 is closed. When the resistance heater 71 is energized to produce heat, it will cause a bimetallic element 74 to be deflected so that terminal 75 thereon will come into contact with terminal 76. Thus even after switch 67 opens after fluid flow through nozzle 62 ceases, as described above, current will continue to flow from battery 21 through lead 69, lead 77, bimetallic element 74, terminal 75, terminal 76, lead 78, lead 70, electric motor 14 and lead 24, to complete a circuit to ground. It can readily be seen that once switch 67 is opened, the circuit through resistance heater 71 will be opened, and thus bimetallic element 74 will start cooling, thus causing terminals 75 and 76 to separate a predetermined time after the flow of solvent through nozzle 62 has terminated. As described above, the electric motor 14 will continue to operate for a predetermined time after the flow of fluid from nozzle 62 ceases, depending on the parameters of the electrical circuit. Because of this construction the continued operation of wiper motor is insured in order to provide a number of dry wipe cycles which rid the windshield of distortion-producing moisture.

Figure 2:
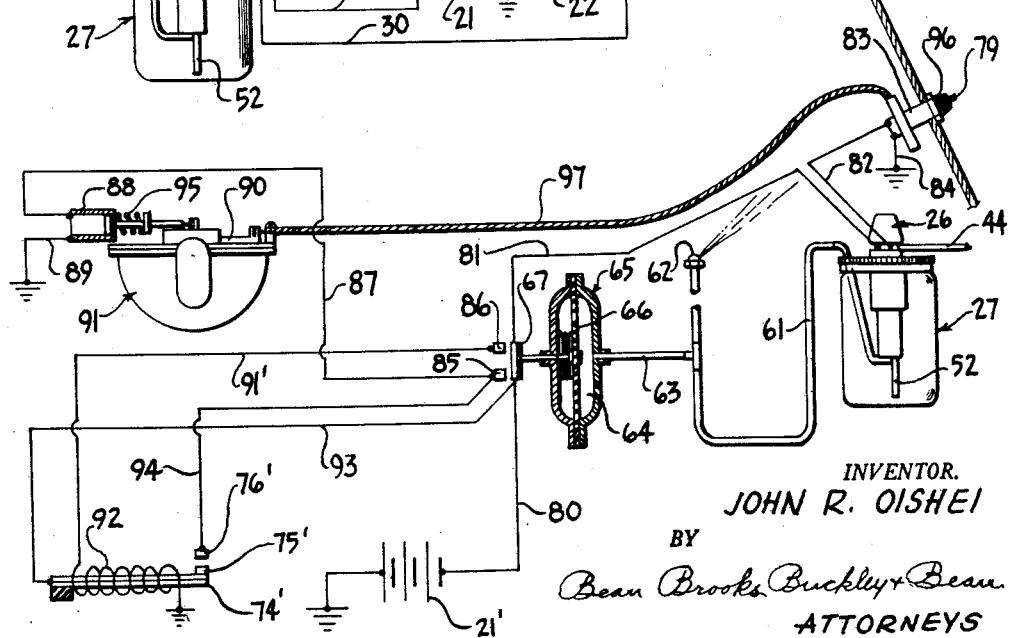
FIG. 2 is a schematic diagram showing the present invention applied to a windshield cleaning system employing a fluid pressure motor.

The invention described above relative to FIG. 1, can be incorporated in a fluid pressure wiper system shown in FIG. 2. The wiper system may include a motor of the vacuum, compressed air, or hydraulic type. When it is desired to actuate the fluid pressure motor, button 79 is depressed, thereby completing a circuit from battery 21' through lead 80, switch 67', lead 81, solenoid switch 26, lead 82, switch 83 and lead 84 to ground. The washer 27 and hydro-electric switch 65 will operate in the same manner described above relative to FIG. 1. When switch 67 is actuated in response to the flow of solvent through nozzle 62, the switch will close against terminals 85 and 86. Thus, a circuit will be completed from battery 21' through lead 80, switch 67, terminal 85, lead 87, solenoid 88 and lead 89, to complete a circuit to ground. The actuation of solenoid 88 will cause slider valve 90 of fluid pressure motor 91 to set the latter in operation in the well known manner. Simultaneously with the energizing of solenoid 88, a circuit is completed from battery 21' through lead 80, switch 67, terminal 86, lead 91' and resistance heater 92 to ground. The resistance heater heats bimetallic element 74', and as the latter deflects, terminal 75' comes into contact with terminal 76'. Thus, a circuit is completed from battery 21' through lead 80, lead 93, bimetallic element 74', terminals 75' and 76', lead 94, terminal 85, lead 87, solenoid 88, and lead 89 to ground. Thus, notwithstanding the movement of diaphragm 66 back to its position shown in FIG. 2 at the termination of the fluid projection with the corresponding opening of switch 67, current will continue to flow through bimetallic element 74' to maintain solenoid 88 energized until the bimetallic element cools sufficiently to cause contacts 75' and 76' to separate. This action, as the construction shows in FIG. 1, will insure a predetermined number of dry wipe cycles to free the windshield of excess moisture. When the circuit to solenoid 88 is broken, spring 95 will cause the slider valve 90 to return to its closed position, whereupon conventional wiper parking mechanism (not shown) will cause the windshield wipers to be positioned out of the field of vision of the driver.

If is is desired to actuate the wiper system independently of the washer in the modification shown in FIG. 2, it is only necessary to manipulate knob 96 which causes a rack and pinion arrangement within the switch housing such as shown in United States Patents Nos. 2,632,471 and 2,648,352, to actuate the Bowden wire unit 97 to properly position slider valve 90 of fluid pressure motor 91.

Figure 5:
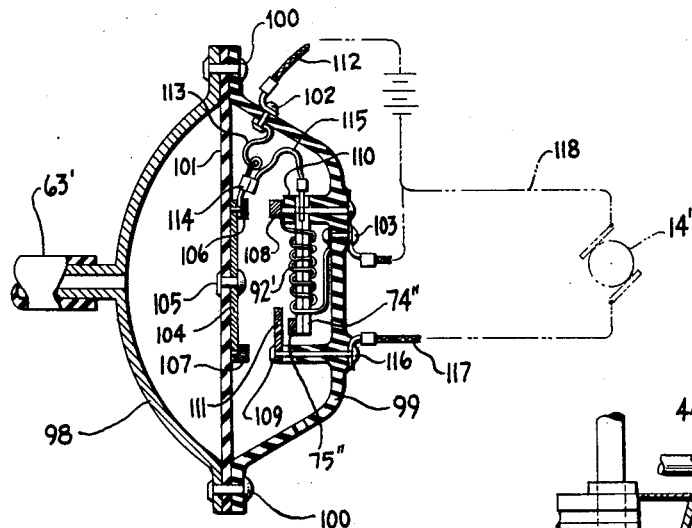
FIG. 5 is a schematic diagram of a control switch which may be utilized to practice the present invention.

In FIG. 5, a schematic representation of a switch which will provide the above described operation is shown. The switch consists of two housing halves, 98 and 99, which are suitably affixed to each other as by rivets 100 with a flexible diaphragm 101 clamped therebetween. The chamber defined by housing half 98 and diaphragm 100 is adapted to communicate with the fluid pressure source through conduit 63'. The chamber defined by housing half 99 and flexible diaphragm 101 houses all of the electric circuitry for causing the above described type of operation. More specifically, a terminal 102 mounted on housing half 99 is adapted to be coupled to one side of a battery and a terminal 103 is adapted to be coupled to the other side thereof. The flexible diaphragm 101 carries a switch armature 104 which is suitably affixed thereto, as by rivet 105. When the diaphragm 101 is distended due to fluid pressure, the terminals 106 and 107 on armature 104 will contact terminals 108 and 109, respectively, to complete a circuit to an electrical device such as motor 14'. Simultaneously, while the switch armature closes the above mentioned terminals, there will be current flow through resistance heating element 92'. A bimetallic element 74" is suitably mounted on stud 110 and is insulated thereby from terminal 108. It can readily be seen that once the bimetallic element 74" is heated sufficiently by resistance heating coil 92' it will deflect to have terminal 75" thereof engage conductor 111 to complete a circuit from the battery to electrical device 14' via lead 112, terminal 102, lead 113, connector 114, lead 115, bimetallic element 74", terminal 75", conductor 111, terminal 116 (which is connected to one side of the electrical device 14' by conductor 117) and conductor 118 (which is connected between the battery and the other side of electrical device 14'). When the bimetallic element 74″ cools, the circuit to the electric device 14′, which may be either an electric motor, as shown in FIG. 1, or a solenoid, as shown in FIG. 2, is broken.

It will readily be appreciated that the switch shown in FIG. 5 may be applied to an existing fluid pressure system with a minimum of effort and expense by merely completing the connections from the components of the wiper and washer system to the appropriate electrical and hydraulic connections of the switch.

It can thus be seen that I have provided a windshield cleaning system which has universal applicability relative to existing systems now in use, which is simple in construction, foolproof in operation and which is economical to manufacture.

While I have described preferred embodiment of my invention, I desired it to be understood that my invention is not limited thereto, but may be otherwise embodied within the scope of the following claims.

I claim:

1. A windshield cleaner comprising a wiper system including a wiping blade and a wiping blade motor operatively coupled thereto, a washer system including a nozzle and pump means operatively coupled thereto for causing said nozzle to project fluid on a windshield, a first control for causing said wiper system to operate independently of said washer system, and second control means including means for energizing said washer system and switch means responsive to operation of said washer system for energizing said wiper system, and an electrical time delay switch operative after the termination of washer operation for causing said wiper system to continue in operation for a period of time.

2. A windshield cleaner comprising a wiper system including a wiping blade and a wiping blade motor operatively coupled thereto, a washer system including a nozzle and pump means operatively coupled thereto for causing said nozzle to project fluid on a windshield, a first control for causing said wiper system to operate independently of said washer system, and second control means including means for actuating said washer system and means for actuating said wiping system incidental to the actuation of said washer system, and an electrical time delay switch operative after the termination of washer operation for causing said wiper system to continue in operation.

3. A fluid-electric switch comprising a housing, a flexible diaphragm in said housing, conduit means on said housing for coupling said housing to a source of variable fluid pressure, an electrical conductor actuable by said diaphragm for completing a circuit from a source of electric current to an electrical device when said diaphragm is distended from its normal position by fluid pressure, a resistance heater adapted to be energized by the distending of said diaphragm, and an element adapted to be motivated by said resistance heater to complete a circuit from said source of electrical current to said electrical device for a predetermined period after said diaphragm returns to its normal position on the release of fluid pressure.

4. A windshield cleaning system comprising a wiper, a motor coupled to said wiper, a washer having a liquid pump, a delivery nozzle, a conduit connecting said pump and nozzle to supply liquid thereto from said pump, means responsive to the flow of liquid through said conduit for starting said wiper motor, and an electrical time delay switch actuable in response to said liquid flow for continuing operation of said motor after the liquid flow stops.

5. A windshield cleaning system comprising a wiper, a wiper motor coupled to said wiper, a washer having a liquid pump, a delivery nozzle, a conduit connecting said pump and said nozzle to supply liquid thereto from said pump, control means for actuating said wiper motor in response to the operation of said pump, and an electrical switch actuable in response to pump operation for continuing operation of said motor for a predetermined period after said pump stops.

6. A windshield cleaning system comprising a wiper, a motor coupled to said wiper, delivery means for delivering fluid to a windshield, a first control for actuating said delivery means, a second control for actuating said wiper motor in response to the delivery of fluid from said delivery means, and an electrical switch actuable during joint operation of said delivery means and said motor for continuing operation of said motor for a predetermined period after said delivery means ceases to operate.

7. A windshield cleaning system comprising a wiper, a motor coupled to said wiper, a washer having a liquid pump, a nozzle, a conduit coupling said pump to said nozzle, means for energizing said washer, means for energizing said wiper to accompany operation of said washer, and an electrical time delay switch operative after the termination of washer operation for maintaining said motor actuated after said washer ceases to operate.

8. A windshield cleaning system comprising a wiper, a motor coupled to said wiper, a washer having a liquid pump, a nozzle, a conduit coupling said pump to said nozzle, means for energizing said washer and said wiper for cleaning a windshield, and an electric circuit for maintaining said motor energized after said washer ceases operation comprising a source of electric current, a first switch adapted to couple said motor to said source of current while said washer is in operation, and an electric time delay switch adapted to maintain said motor in operation for a predetermined period after said washer ceases to operate.

9. A windshield cleaning system comprising a wiper and a motor coupled to said wiper, an electrically energized washer having a liquid pump, a nozzle, a conduit coupling said pump to said nozzle, means for jointly energizing said washer and said wiper for cleaning a windshield including a coordinated electric circuit for maintaining said motor energized after said washer ceases operation, said coordinated electric circuit comprising a source of electric current, a first switch adapted to set said washer in operation, means to couple said motor to said source of current and while said washer is in operation, and a thermo-electric time switch actuable during joint washer-wiper operation and operable after the termination of washer operation to insure said motor operation for a period after said washer ceases to operate.

10. A windshield cleaning system comprising a wiper, a motor coupled to said wiper, a washer having a liquid pump, a nozzle, a conduit coupling said pump to said nozzle, means for energizing said washer and said wiper for cleaning a windshield, an electric circuit for maintaining said motor energized after said washer ceases operation, comprising a source of electric current, a switch adapted to cause said motor to be maintained in operation while said washer is in operation, and an electric time delay switch adapted to maintain said motor in operation after said washer ceases operation.

11. A windshield cleaning system comprising a wiper, a motor coupled to said wiper, delivery means for delivering fluid to a windshield, a first control for actuating said delivery means, a second control for actuating said wiper motor in response to the delivery of fluid from said delivery means, and electrical means for continuing operation of said motor for a predetermined period after said delivery means ceases to operate, said electrical means including switch means automatically actuatable during joint operation of said delivery means and said motor.

References Cited in the file of this patent

UNITED STATES PATENTS

| | | |
|---|---|---|
| 2,343,732 | Baird | Mar. 7, 1944 |
| 2,751,458 | Kayuha | June 19, 1956 |
| 2,816,316 | Oishei | Dec. 17, 1957 |